United States Patent [19]

Derode

[11] Patent Number: 4,568,554

[45] Date of Patent: Feb. 4, 1986

[54] METHOD FOR PREPARING CHEESE

[76] Inventor: Bernard Derode, 28 Boulevard d'Inkermann, 92200, Neuilly sur Seine, France

[21] Appl. No.: 517,829

[22] Filed: Jul. 27, 1983

[30] Foreign Application Priority Data

Sep. 29, 1982 [FR] France ................................ 82 16365

[51] Int. Cl.⁴ ............................................. A23C 19/05
[52] U.S. Cl. ..................... 426/582; 99/459; 99/465; 425/84; 426/515
[58] Field of Search ............... 426/582, 512, 515, 516; 99/452, 456, 453, 458, 459, 465; 425/84; 249/127, 141

[56] References Cited

U.S. PATENT DOCUMENTS

| | | |
|---|---|---|
| 31,834 | 3/1861 | Stone . |
| 254,294 | 2/1882 | Engi . |
| 2,494,637 | 1/1950 | Stine . |
| 2,917,827 | 12/1959 | Lankford . |
| 3,221,407 | 12/1965 | Jagoueix . |
| 3,295,205 | 1/1967 | Sjoholm . |
| 3,645,751 | 2/1972 | Wakeman ............................ 426/582 |
| 3,732,110 | 5/1973 | Pontecorvo . |
| 3,836,684 | 9/1974 | Pontecorvo . |
| 3,841,210 | 10/1974 | Brog ........................................ 99/456 |
| 4,003,490 | 1/1977 | Corbic nee Busnel ............. 220/22.3 |
| 4,058,630 | 11/1977 | Corbic nee Busnel ............... 426/36 |
| 4,263,330 | 4/1981 | Streeter et al. .................. 426/512 X |
| 4,311,087 | 1/1982 | Brinkman . |

FOREIGN PATENT DOCUMENTS

| | | |
|---|---|---|
| 2166939 | 10/1976 | Fed. Rep. of Germany . |
| 2020455 | 7/1970 | France .................... 99/456 |
| 2097557 | 3/1972 | France . |
| 2215165 | 8/1974 | France . |
| 2275144 | 1/1976 | France . |
| 2287166 | 5/1976 | France .................... 426/512 |
| 2414866 | 8/1976 | France . |
| 2426406 | 12/1979 | France .................... 99/456 |
| 2428392 | 1/1980 | France . |
| 2428400 | 1/1980 | France . |
| 2430721 | 2/1980 | France . |
| 2432269 | 2/1980 | France . |
| 2437777 | 4/1980 | France . |
| 2443199 | 7/1980 | France . |
| 2443800 | 7/1980 | France . |
| 2447677 | 8/1980 | France . |
| 2448287 | 9/1980 | France . |
| 2449850 | 9/1980 | France . |
| 2451157 | 10/1980 | France . |
| 2451708 | 10/1980 | France . |
| 2451709 | 10/1980 | France . |
| 2452875 | 10/1980 | France . |
| 2456467 | 12/1980 | France . |
| 2456468 | 12/1980 | France . |
| 2459611 | 1/1981 | France . |
| 2466188 | 4/1981 | France . |
| 2470534 | 6/1981 | France . |
| 2471743 | 6/1981 | France . |
| 2472420 | 7/1981 | France . |
| 2473840 | 7/1981 | France . |
| 2474816 | 8/1981 | France . |
| 2476438 | 8/1981 | France . |
| 2478951 | 10/1981 | France . |
| 2481829 | 11/1981 | France . |
| 2484380 | 12/1981 | France . |
| 2489094 | 3/1982 | France . |
| 2480561 | 4/1982 | France . |
| 2491291 | 4/1982 | France . |
| 2491292 | 4/1982 | France . |
| 2491725 | 4/1982 | France . |
| 2462253 | 7/1982 | France . |
| 2429555 | 12/1982 | France . |
| 2447142 | 12/1982 | France . |
| 8101071 | 10/1981 | Netherlands ...................... 425/84 |

Primary Examiner—Arthur L. Corbin
Attorney, Agent, or Firm—Fitzpatrick, Cella, Harper & Scinto

[57] ABSTRACT

Soft paste cheese is formed by mixing curd forming additives from burettes with milk flowing in a funnel and directing the resulting curd forming milk mixture into a basin-like receptacle in which a mold block made up of an array of vertically elongated perforated molds of substantially uniform and unobstructed cross section have been placed to fill the receptacle and the molds and, after curds and whey have formed and stratified, removing the whey and lifting the molds as a group onto a draining plate, placing inverted molds of like cross section over the molds and turning the mold assembly to turn the cheese therein for further draining and removing the cheese from the molds.

27 Claims, 22 Drawing Figures

METHOD FOR PREPARING CHEESE

BACKGROUND OF THE INVENTION

1. Field of the Invention

This invention relates to the processing of soft or fresh cheeses which are shaped in molds from which the cheese curd is drained and in particular the invention concerns a novel method for manufacturing such cheeses so as to produce a high quality product with minimum curd breakage at miminal cost. While not so limited, the invention is especially advantageous in the production of goat's milk cheese.

2. Description of the Prior Art

To make soft or fresh cheeses, one generally pumps raw milk from a reservoir into a pasteurization or reheating apparatus and then into a curdling receptacle where rennet and fermenting ingredients are added. Once the milk is curdled, the curdled morsels are extracted with a ladle and are disposed in individual perforated molds or special draining baskets.

One important factor on which the quality of the cheese depends is whether or not the curd, which is very delicate, is broken during this operation. Moreover, in order to make the cheese in each mold or draining basket to have the same gradation of weight and consistency from top to bottom, each curd portion which ladled out of the curdling receptacle and into the molds must be put into each mold at the same level corresponding to the level at which it was taken from the curdling receptable. After the cheese portions have drained on one side in their draining basket, they are turned and then returned to their draining basket to be drained on the other side. Thereafter they are disposed in groups on the racks of a dryer, then on those of the drying room.

Thus, each cheese portion must be manufactured individually. Such manufacturing technique is costly in labor, and, as seen from the foregoing, it is not exempt from risks. In addition, in the curdling receptacle, the curd is more or less drained depending on the depth at which it is extracted with the ladle. Thus the different cheese portions that are fabricated in this way are likely not have the same qualities, especially not the same weight since the volume the cheese loses during draining depends, of course, on how much the curd has been drained as of the time it is put into the mold.

It has been proposed in U.S. Pat. Nos. 3,732,110 and 3,836,684 to manufacture soft cheese, i.e. ricotta cheese, by placing a mixture of curd milk mixture into interconnected processing cells or into a common vat at the bottom of which are placed curd collecting strainer baskets or strainer cannisters. After curds have formed in the cells or the vat, the cells or vat are drained of whey, and the curds, which float on the whey, are directed into the baskets or strainer cannister which are then removed for drying. Although in U.S. Pat. No. 3,732,110 the curds are formed in individual cells, the baskets associated with the cells cannot be handled as a unified group and instead a rather complex arrangement of support arms and harnesses must be provided. These support arms and harnesses do not allow convenient turning of the cheese in the molds and especially, they do not allow turning of the molds as a group. These harness elements also interfere with the movement of the curds into the basket which may disturb the curdling milk and may cause deterioration of the quality of the cheese. Another difficulty with the arrangement used in U.S. Pat. No. 3,732,110 is that it permits of drainage only at the bottoms of the mold baskets; and the lost curd coming out with the whey may concentrate at the entrance to the drain opening and may obstruct it. In U.S. Pat. No. 3,836,684 the strainer cannisters are arranged so that they could be handled as a group; but they are separated from the common vat in which the curds are formed. Thus, the transfer of the curds from the vat into the individual strainer cannisters also subjects the curds to breakage and deterioration of the quality of the cheese.

SUMMARY OF THE INVENTION

This invention seeks to overcome the above described disadvantages of the prior art and to provide a novel method for processing soft cheese which is convenient and inexpensive and which reliably produces cheese of uniformly high quality.

According to one aspect of the invention, a curd forming milk mixture, which may contain, for example, milk, acid and rennet, is placed into a plurality of closely spaced vertically elongated molds of substantially uniform and unobstructed internal cross section and formed with perforations in at least their lower region. The temperature of the mixture in the molds is maintained at a value sufficient to cause curds and whey to form in the molds. During this time flow out through the perforations is prevented by sealing off the region outside the molds. The curds and whey are allowed to stratify in the molds. The whey is then removed from the molds and the curds formed in each mold are allowed to settle in the perforated lower region thereof to form cheeses in said molds. The cheeses are then drained in the molds by allowing liquid, such as whey, to flow out through the perforations. The cheeses are thereafter removed from the molds and dried.

According to another aspect of the invention there is provided a novel apparatus for processing soft cheese comprising a plurality of vertically elongated molds of substantially uniform and unobstructed cross section and formed with perforations in at least their lower regions. Means are also provided to control the flow of liquids through the perforations. Means are provided to place a curd forming milk mixture in the molds, while flow through the perforations is interrupted. In a preferred arrangement there is inserted in the spaces between the molds and in the space available outside the molds, displacement elements whose volume displaces the curd forming mixture in those spaces and causes it to flow back inside the molds causing the mixture in the molds to be raised to a desired level. Means are also provided to bring and maintain the curd forming milk mixture at a temperature sufficient to cause curds and whey to form within the molds. Further, the means for controlling the flow of liquids through the perforations are operable to permit whey to drain through the perforations after the curds and whey have formed and stratified therein so that only curd remains in said molds to form cheeses therein. In the case where the molds are filled while in a basin and the basin is only partly drained either through a siphon at the upper part of the basin or by a tap at the lower part, completion of the drainage will take place after the molds have been lifted up out of the basin and any curd left in the basin can be recovered. This is done by providing a perforate filtering sack as a liner in the basin before the molds are put in. After the molds have been removed the sack is lifted out and the remaining curd will be retained in the sack while the remaining whey drains out.

The method of this invention makes possible the efficient and economical production of high quality soft cheese because, with the invention, the cheese curds develop in the very mold in which the cheese is formed and the curds are not transferred from one receptacle to another nor are they subjected to obstructions or radical changes in cross section of the receptacle.

The invention includes other more specific features which will be appreciated from the following detailed description of the preferred embodiments.

BRIEF DESCRIPTION OF THE DRAWINGS

Selected preferred embodiments of the invention have been chosen for purposes of illustration and description and are shown in the accompanying drawings forming a part of the specification wherein.

DETAILED DESCRIPTION OF THE PREFERRED EMBODIMENTS

Figures 1, 2:
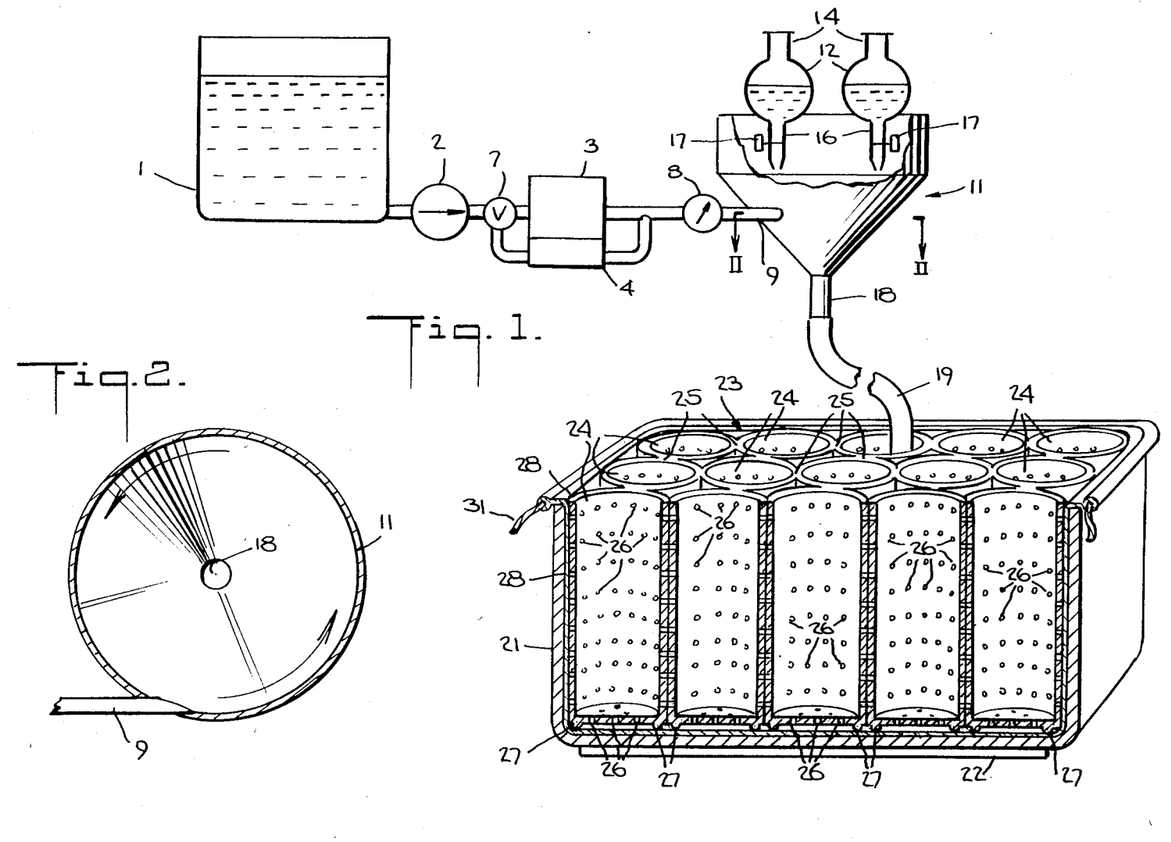
FIG. 1 is a schematic view showing the elements involved in the preliminary stages of a cheese making process according to the invention.
FIG. 2 is a view taken along line II—II of FIG. 1.

As shown in FIG. 1 raw milk, for example, goats milk, contained in a reservoir 1 is pumped therefrom by a pump 2 and is delivered thereby through a pasteurisation apparatus 3, for example a Stoutz pasturizer.

Alternatively the milk may be diverted around the pasturizer and through a heater 4. The heater may be a part of the pasturizer. Its role is to deliver the raw milk at the desired temperature even though it has not been heated during pasteurization. A bypass valve 7 is provided to regulate the diversion of milk around the pasturizer. A flow meter 8 is provided at the common exit of the apparatus 3 and the heater 4, and is followed by means for adding some additives to the milk such as ferment, rennet, penicillum, etc.

In accordance with a preferred arrangement, a conduit 9 from the flow meter 8 opens into the interior of the funnel 11 at a tangent to its trunconic wall as shown in FIGS. 1 and 2. By way of example, in an arrangement set up to flow 600 liters of milk per hour the funnel 11 would preferably have a diameter of about 60 cm. Two burettes 12 are mounted above the funnel 11. The burettes 12 each contain an enlarged central portion, a filling neck 14 at the top and an emptying tube 16 at the bottom. The flow rate out from the emptying tube is controlled by a valve 17. Preferably, means (not shown) are provided to maintain a constant level of fluid in each of the burettes 12. Each burette contains an additive (e.g. ferment, rennet, penicillum) to be added to the milk before the curdling. Of course, there can be any number of burettes 12 according to the particular type of cheese to be processed. The funnel and burette system can be replaced by a classical dosing pump.

The funnel 11 is formed with a bottom exit 18 leading to a supply tube 19 by which the mixture of milk and additive is continuously supplied. The tube 19 extends into a curdling receptacle 21 formed in the shape of a large open top rectangular basin. An electrical heater 22 may be arranged on the underside of the receptacle 21 for maintaining proper temperature in the receptacle where needed for the curd of certain types of cheese. This electrical heater may comprise resistance elements embedded in an insulating layer glued to the bottom of the receptacle.

A mold block 23 is disposed in the curdling receptacle 21. This mold block comprises a number of vertically elongated molds 24 which are of essentially uniform and unobstructed cross section throughout their length. In the embodiment shown the molds 24 are of cylindrical shape and they are connected to each other where they touch along their sides, as shown at 25. The molds 24 may be made of any suitable substance such as metal or plastic and they may be attached to each other by any suitable means such as solder, weldments adhesive or clamps. The attachment of the molds to each other maintains them in an array so that all of the molds may be handled together as a group. The molds 24 in FIG. 1 are open at the top and are closed at the bottom and they are provided with perforations 26 over their side and bottom surfaces. The diameter of the perforations is large enough to permit free flow of the curdling milk mixture into the molds and to permit free flow of whey out from the molds but to prevent flow of curd out from the molds. The bottoms of the molds 24 are formed with feet 27 which rest on the bottom of the basin 21 and hold the bottom surfaces of the molds up off the bottom of the basin so that the curdling milk and whey can freely flow into and out from the bottom of the molds.

The average diameter of the molds 24 corresponds to that of the cheeses to be produced before the eventual drying. The height of the molds, on the other hand, greatly surpasses the vertical height of the cheese to be produced, and corresponds to the quantity of milk necessary to produce cheese having the desired dimensions. That is, for a desired height of cheese to be produced, the molds 24 should each have a height corresponding to the height of the curd forming milk mixture necessary to produce the desired height of cheese. For example, where goat's milk cheeses are to be produced at a height of 10 cm. from an average goat milk the height of the molds 24 should be at least 60 cm. The receptacle or basin 21, of course, must be at least as high as the molds. Also, where a concentrated milk mixture is used, the height of the molds will be less.

The molds 24 are arranged in an array with their axes parallel to each other and they are disposed according to a horizontal plan such that the mold block 23 includes, for example, five rows of five molds each or twenty five molds arrayed in a square.

The interior walls of the receptacle or basin 21 are lined with draining sack 28 of cheesecloth sewed to conform to the shape of the receptacle. The top of the sack 28, which is adjacent to the upper edge 25 of the receptacle or basin 21, is formed with a hem through which a cord 31 is passed.

The operation of the apparatus thus far described will now be given.

Initially, the sack 28 is disposed in the receptacle or basin 21 and thereafter the mold block 23 is placed in the receptacle as shown in FIG. 1. It will be seen that the interiors of the several molds 24 are in fluid communication with each other via their perforations 26 and via the small spaces between the exterior sides of the molds 24 and the internal borders of the receptacle 21.

The valves 17 are then regulated to provide a proper rate of flow of curdling fluids. It is preferred first to establish a proper relative rate of flow from the various burettes and then to measure this flow by any appropriate means (not shown) and to control the operation of the milk pump 2 according to such flow. This technique is preferred over that of regulating the flow from the burettes in accordance with the milk flow because very small adjustments in flow from the burettes can have a significant effect on the mixture whereas comparable adjustments of the milk flow have a more moderate effect on the mixture.

The milk arriving in the funnel 11 from the conduit 9 forms a whirlpool in the funnel which homogenizes it by turbulence with the additives which drop from the burettes 12 onto the milk flowing around the inner surface of the funnel, thereby to form a curdling milk mixture.

The milk mixture is flowed from the bottom of the funnel 11 and through the conduit 19 to the receptacle or basin 21 to fill it up to the top of the molds 24. During this operation the molds 24 become filled simultaneously; and at the same time, the small spaces between the receptacle or basin 21 and the molds also become filled. This simultaneous filling of the molds and its spaces between them occurs due to the intercommunication provided by the perforations 26 in the mold surfaces. That is, because the interiors of the molds 24 are in fluid communication with each other via their perforations 26, the curd forming milk mixture, which is supplied at one location of the receptacle or basin 21, passes into each of the molds 24 via the performations. It will be appreciated that because the molds 24 are densely arranged in the mold block 23 and the mold block 23 itself fits closely inside the receptacle or basin 21, the portion of the curd forming milk mixture which is not actually contained within the molds themselves is very small.

The curd forming milk mixture in the receptacle 21 is maintained at the proper temperature for curdling (i.e. about 25° C.); and the mixture is left immobile at this temperature until curdling occurs (i.e., about 30 minutes). During this time curd 30 (FIG. 3) and whey 32 form and stratify in the receptacle 21 and in the molds 24.

Figure 3:
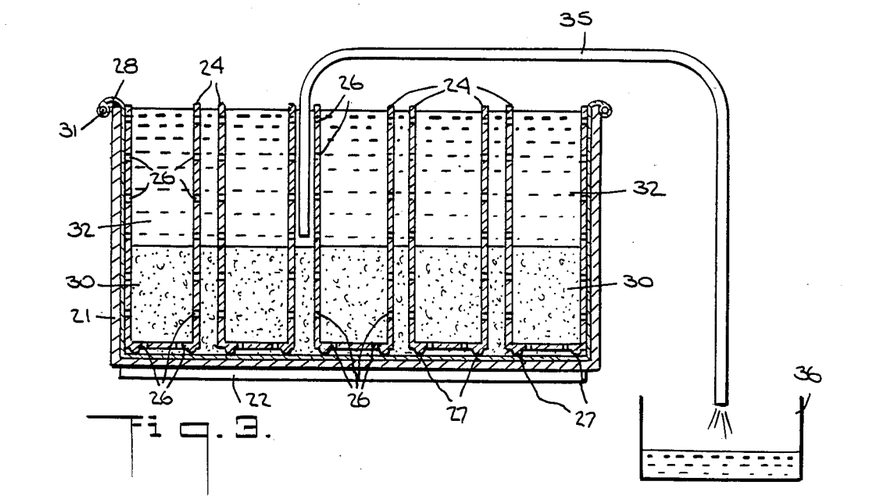
FIG. 3 is a side elevational section view of a curdling receptacle forming one of the elements of FIG. 1.

Depending on which ferments are used, the curd 30 can form at the surface or at the bottom of the molds 24. This latter case is represented in FIG. 3. In either case, it is very important in the making of soft or fresh paste cheese that during the curd formation, the molds 24 are not shaken or vibrated and that no interference is encountered by the curd as it forms in one portion of the mold.

Figure 4:
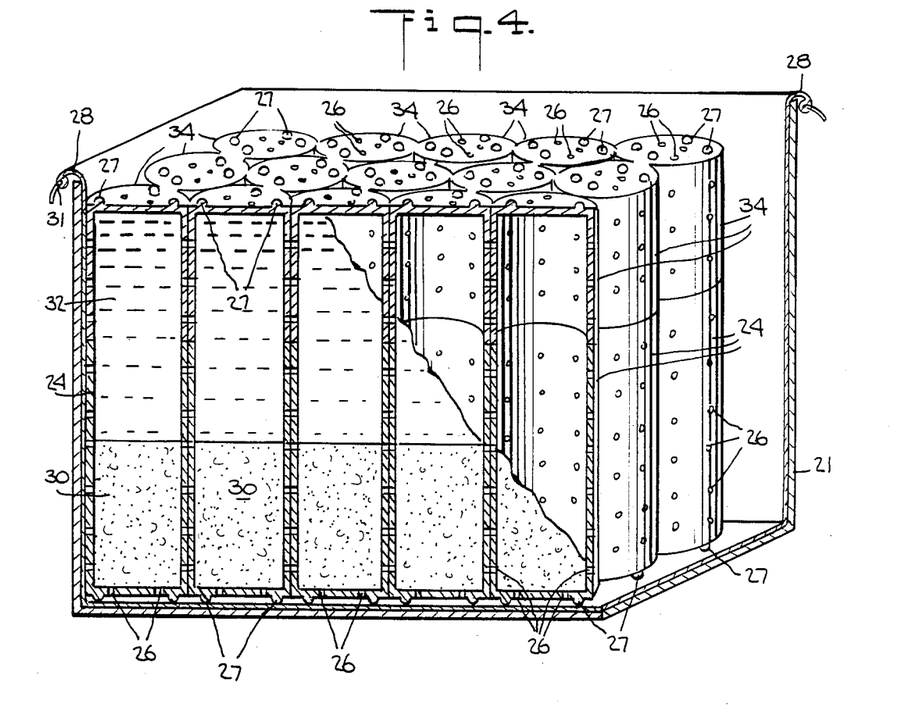
FIG. 4 is a perspective view of a mold block assembly used in a further improvement of the cheese making process according to the invention wherein there is shown a mold having a double end and which can be divided into two parts to allow outmolding of the cheese.

FIG. 4 shows an alternate mold arrangement where there is provided a group of upper molds 34 which are inverted and placed on top of the molds 24. The upper molds 34 are of the same diameter as the molds 24 and are aligned with them in the receptacle or basin 21. As shown, the upper molds 34 are also formed with perforations 26 as well as feet 27 at their closed upper ends. As can be seen in FIG. 4, the height of the combined molds 24 and 34 is such that the milk mixture in the receptacle or basin 21 just covers the molds. Also, the upper molds 34 are of considerably less height than the molds 24; and, after the curd 30 has formed it is substantially below the upper level of the molds 24.

When the curdling is complete, the whey 32 is removed from the receptacle or basin 21. Where the curd 30 forms at the bottoms of the molds 24, as shown in FIG. 3, the whey 32 is siphoned out by inserting a flexible tube 35 into or between the molds 34 just above the curd 30 and siphoning the whey out from the receptacle 21 and into a gutter 36. During this siphoning, the whey will flow through the mold perforations 26 so that it may be removed from the molds and the spaces between the molds without moving the tube 35. In the case where the upper molds 34 of FIG. 4 are used, the tube 35 need merely be inserted into one of the spaces between the molds.

It will be appreciated that in this manner all the remaining whey 32 is removed without removal of any significant quantity of the curd 30. The mold block 23 is then removed from the receptacle or basin 21 and is set on a draining plate where draining of whey through the perforations 26 continues through the effects of gravity. The curd 30 on the other hand does not pass through the perforations 26 and remains as cheese within the molds. The feet 27 formed on the bottoms of the molds 24 hold their bottom surfaces a slight distance above the draining plate to permit drainage through the perforations in the bottoms of the molds.

Figure 5:
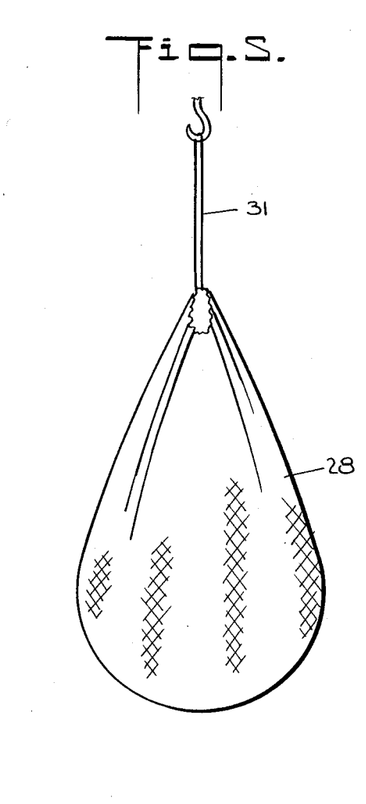
FIG. 5 is a perspective view of a curd draining sack which may be used when carrying out a cheese making process according to the invention.

After the molds 24 have been removed from the receptacle or basin 21, the draining sack 28 is taken out of the receptacle and is suspended by its cord 31 as shown in FIG. 5 to allow it also to drain. The sack 28 contains whey, which can filter through its pores, and curd, which is retained. The curd which is retained in the sack 28 is broken and cannot therefore give cheese of the same quality. However, this remaining curd, which is small in amount compared to that in the molds 24, can nevertheless be used to make extruded cheese or the like.

When whey has stopped draining from the molds 24 of the mold block 23, a group of further molds similar to the molds 34 of FIG. 4, are placed upside down on top of the molds 24. In the case where the molds 34 are used as described in FIG. 4, they are simply left in place over the molds 24. In either case the height of the upper molds is made equal to or slightly greater than that of the cheeses 41 which are at the bottoms of the molds 24 at this phase of the draining.

Figure 6:
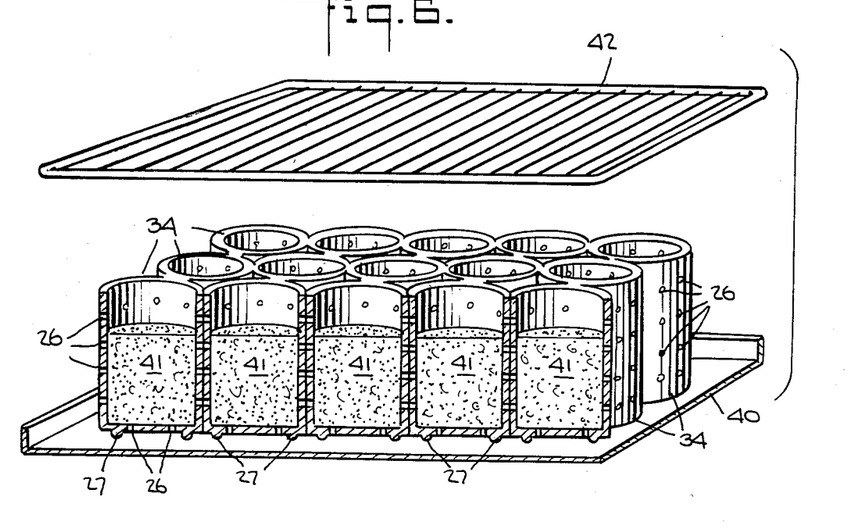
FIG. 6 is a perspective view of a drying mold and rack assembly used in a later stage of a cheese making process according to the invention.

The molds 24 containing the freshly formed cheeses 41 and having the upper molds 34 aligned with them, are inverted together with the upper molds so that the cheeses 41 are reversed and fall into the upper molds as shown in FIG. 6. As can be seen, the cheeses 41 thus continue to drain through the perforations 26 in the upper molds 34 while those molds rest on a draining plate 40.

After the cheese in the molds has been completely drained, a drying rack 42 is placed on top of the molds 34 and the molds 34 and the rack 42 are together inverted to return the cheeses 41 to their original position but resting on the rack 42. The molds block 34 are then removed and the rack 42 is placed in a dryer (not shown).

Figure 7:
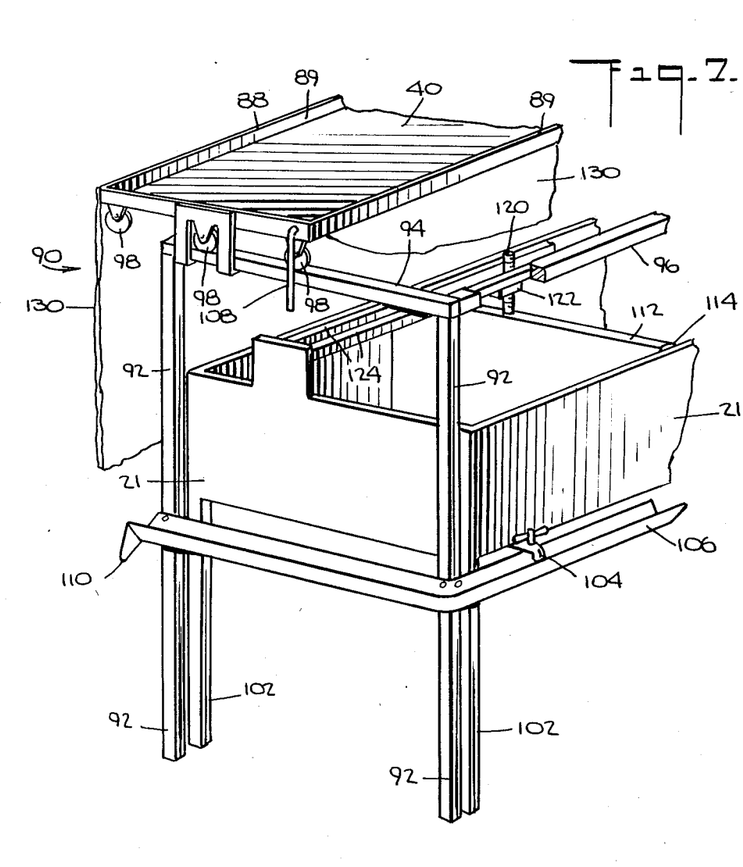
FIG. 7 is a fragmentary perspective view of a drying table used in a later stage of a cheese making process according to the invention.
Figure 8:
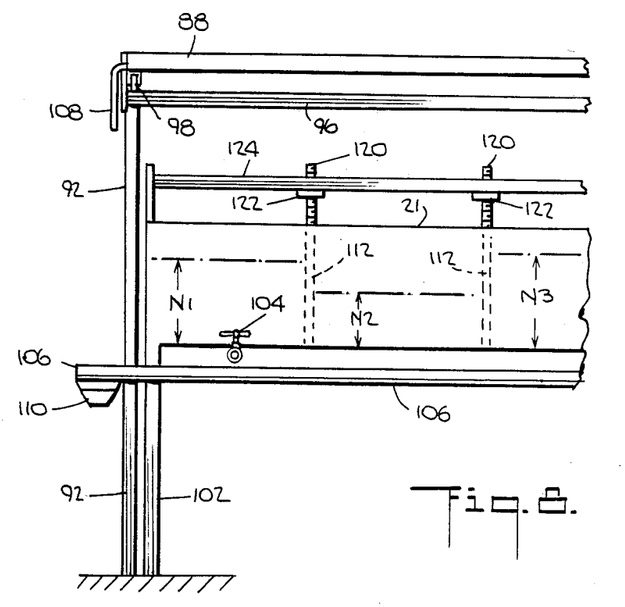
FIG. 8 is a front elevation view of the drying table of FIG. 7.

As shown in FIGS. 7 and 8, the draining plate 40 is formed as part of a moveable tray 88 mounted on top of a draining table 90. As shown, the tray 88 has short vertical sides 89 to contain whey which is drained out of the molds when they are set on the plate 40. The draining table 90 has vertical legs 92 at its corner which are interconnected at their upper ends by lateral and longitudinal rails 94 and 96. As shown, the moveable tray 88 is provided with three wheels 98 at each end thereof which are arranged to ride along the lateral rails 94 of the table 90. A bracket 100 extends down from each side of the center wheel 98 and is bent to extend under the rail 94. This bracket allows the tray to roll back and forth along the direction of the lateral rails 94 until the bracket abuts one of the legs 92 of the table as shown in FIG. 7. At this position one of the wheels 98 is no longer on the lateral rail 94 but because the bracket 100 extends under the rail it keeps the moveable tray 88 from tilting and falling off the table 90. The width of the table 90 and the width of the moveable tray are such that when the tray is moved until the bracket 100 abuts one of the table legs 92 it uncovers one half of the table 90.

The receptacle or basin 21 in FIG. 7 is provided with its own separate set of legs 102; and the receptacle or basin fits under the draining table 90 inside the legs 92. By mounting the receptacle or basin 21 on separate legs any shaking or vibration of the draining table which may occur when molds are being placed or inverted on the tray 88, or when the tray itself is moved, will not be communicated to the receptacle or basin. Thus the curd being formed in the molds will not be disturbed or broken.

In the arrangement of FIG. 7, a tap 104 is provided at the bottom of the receptacle or basin 21 to drain any residual whey after removal of the molds 24 and the sack 28. A gutter 106 is attached to the legs 92 of the draining table 90 and extends under the tap 104. The siphon tube 35 (FIG. 3) may also be arranged to drain into the gutter 106. A further drain tube 108 extends out from the lowermost portion of the tray 88 on the table 90 to direct whey from the molds on the tray down to the gutter 106. The gutter 106 extends along one longitudinal side and one transversal side of the draining table 90 and it is tilted slightly toward an outlet 110 from which the whey may be collected for further use or disposal.

The arrangement of a draining Table 90 in conjunction with the receptacle or basin 21 mounted on separate legs permits the above described cheese making process to be carried out in an especially economical and efficient manner. By way of example, the table 90 may have a length of about three meters and a width of about one meter. Preferably the receptacle or basin 21 and the draining tray 88 are mounted at different levels, i.e. waist and shoulder height respectively, for convenient loading of the molds 24 into the receptacle or basin and for convenient transfer of the molds from the receptacle or basin 21 onto the tray 88.

Figure 9:
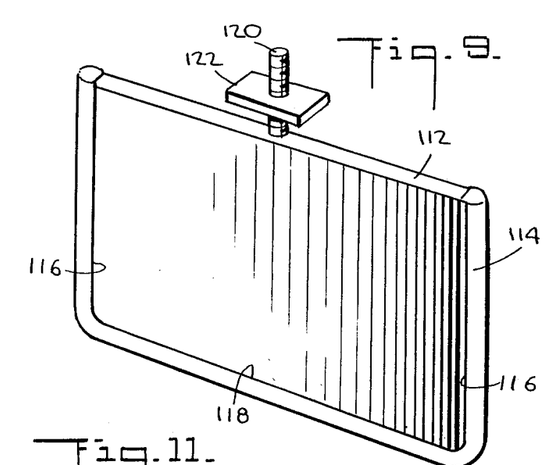
FIG. 9 is a perspective view of a moveable dividing wall which may be used with the table of FIGS. 7 and 8.

As shown in FIGS. 7 and 8, the curdling receptacle or basin 21 may be partitioned so that different groups of molds 24 of different sizes may be filled to different levels at the same time. This partitioning is achieved by one or more rectangular moveable walls 112 (FIG. 9), the contour of which conforms to the transverse interior shape of the receptacle or basin 21. A gasket 114 extends along the side and bottom edges 116 and 118 of each wall 112 and serves to seal the wall to the interior surfaces of the receptacle or basin 21, to divide it into isolated compartments.

A threaded stem 120 extends up from and is rigidly attached to the upper edge of each wall 112 and a nut 122 is threaded on this stem. As FIGS. 7 and 8 show, the threaded stem 120 extends between two fixed parallel rails 124 which extend above and along the longitudinal direction of the receptacle or basin 21. The nut 122 is located below the rails 124.

The walls 112 may be moved along the receptacle or basin 21, or they may be taken out completely by loosening the nuts 122. On the other hand, the walls 112 may be fixed in position by tightening the nuts 122 so that they push up against the rails 124 to force the walls 112 towards the bottom of the receptacle or basin 21. This tightening also permits the gaskets 114 to seal against the walls of the receptacle or basin 21.

As shown in FIG. 7, one or more curtains 130, preferably thermally insulative, are mounted in a moveable fashion on the draining table 90 to enclose the space between the receptacle or basin 21 and the draining tray 88 when the latter is in its position where it completely covers the receptacle.

The operation of the apparatus will now be described. First the sack 28 is placed in the receptacle or basin 21 and then the molds 24 are placed therein. If the embodiment of FIG. 4 is used, the upper molds 34 are positioned over the molds 24.

To fill the molds 24 (and the upper molds 34 in the case of the embodiment of FIG. 4) with curd forming milk mixture from the funnel 11, the draining tray 88 is first shifted to the position of FIG. 7 and then the flexible tube 19 from the funnel 11 is directed into the curdling receptacle or basin 21.

If desired, pairs of mold blocks 23 may be disposed widthwise in the receptacle or basin 21 and may be separated from an adjacent pair of mold blocks by a wall 112. In such case a single sack 28 may be used for two mold blocks. This makes it possible to fill adjacent pairs of mold blocks to different levels as indicated by N1, N2, N3 in FIG. 8 and thereby to make cheeses whose heights are different from one compartment to another, or even to make cheeses of different natures (by use of different additives) from one compartment to another.

When the curdling receptacle or basin 21 and the molds 24 (and the molds 34 in the case of the embodiment of FIG. 4) contained therein are filled with the curd forming milk mixture from the funnel 11, the draining tray 40 is shifted to a position centered above the mold blocks and the curtains 130 are put in place. In this manner there is formed an enclosure which maintains a proper curdling temperature (about 25° C.) without the need to maintain the entire working area at such temperature. This permits economy of energy as well as more comfortable working conditions.

When the whey from the receptacle or basin 21 has been siphoned in the gutter 106, as disclosed in connection with FIG. 7, the draining tray 40 is shifted to the position shown in FIG. 7. The molds 24 are then lifted as a group out of the receptacle and disposed on the draining tray where they continue to drain, with the whey being evacuated via the drain tube 108. During this draining operation groups of new molds 24 can be placed in the receptacle or basin 21. The continued draining and inverting of the cheeses 41 into the upper molds 34 (FIG. 4) takes place on the draining tray 80.

Figure 10:
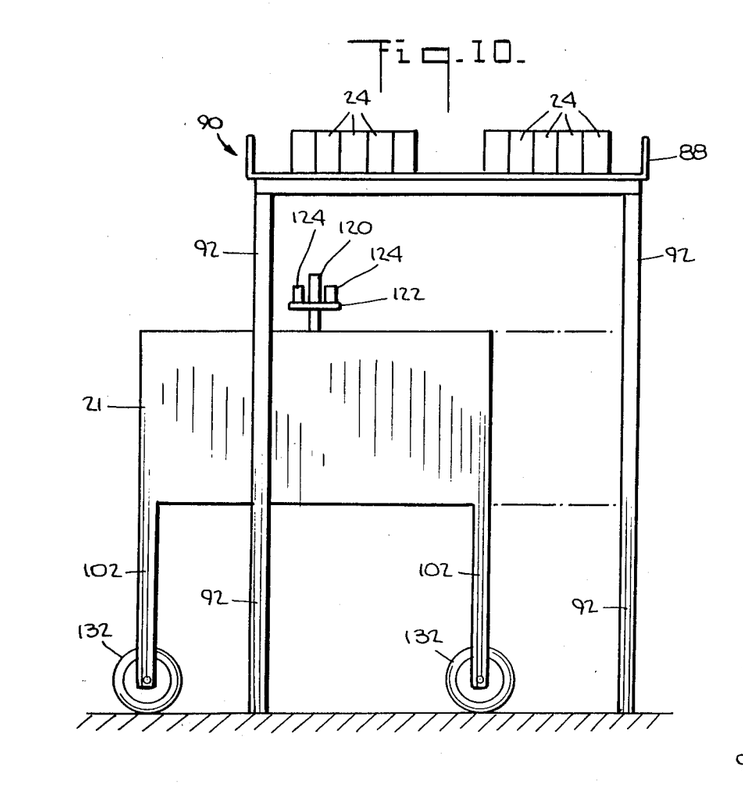
FIG. 10 is a side elevational view of an alternate drying table arrangement.
Figure 11:
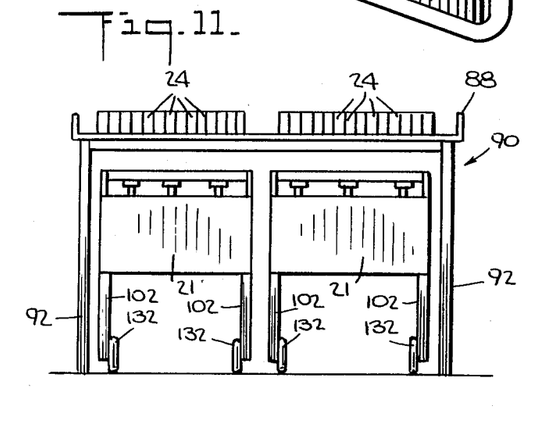
FIG. 11 is a front elevational view of the drying table arrangement of FIG. 10.

FIGS. 10 and 11 show an alternate curdling basin and drain table arrangement. As shown in FIGS. 10 and 11 the draining tray 88 is fixed to the vertical legs 92 of the draining table 90 and the legs 102 on the receptacle or basin 21 are provided with wheels 132 to allow the receptacle or basin to be positioned directly under the draining tray 88 or to be pulled part way out on each side thereof for unloading different groups of molds 24 to be placed on the draining tray 88. As shown in FIG. 11, separate receptacles or basins 21 may be individually provided with legs 102 and wheels 132 for independent movement relative to the draining tray 88 so that different groups of molds 24 can be drained and inverted while other groups are being filled in the various receptacles or basins 21.

Figure 12:
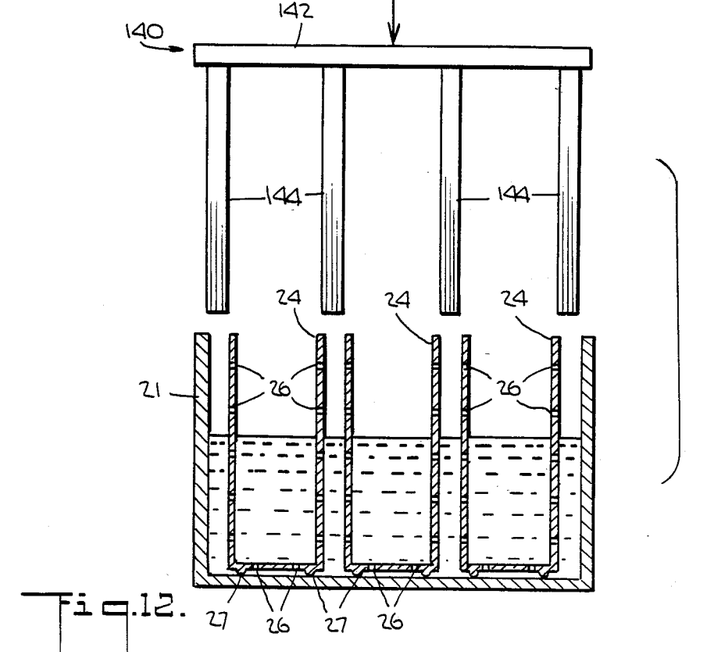
FIG. 12 is a diagrammatic elevational view showing a displacement element about to be inserted into a receptacle or basin containing molds and a curd forming milk mixture.

FIGS. 12-15 show a modification which greatly minimizes any loss of curd by ensuring that virtually all curd formation takes place inside the molds 24 themselves. As shown in FIG. 12 after the molds 24 are positioned in the receptacle or basin 21, the curd forming milk mixture is placed into the basin as previously described. However, as will be noted, the level of the mixture is below the upper level of the molds 24 and the receptacle or basin 21. A displacement member 140, comprising an upper base 142 and a plurality of downwardly projecting rod-like elements 144, is suspended above the molds 24 and the receptacle or basin 21. The cross section of the elements 144 and their spacing conforms to the cross section and spacing of the regions between the molds 24 and between the molds and the receptacle or basin 21.

Figure 13:
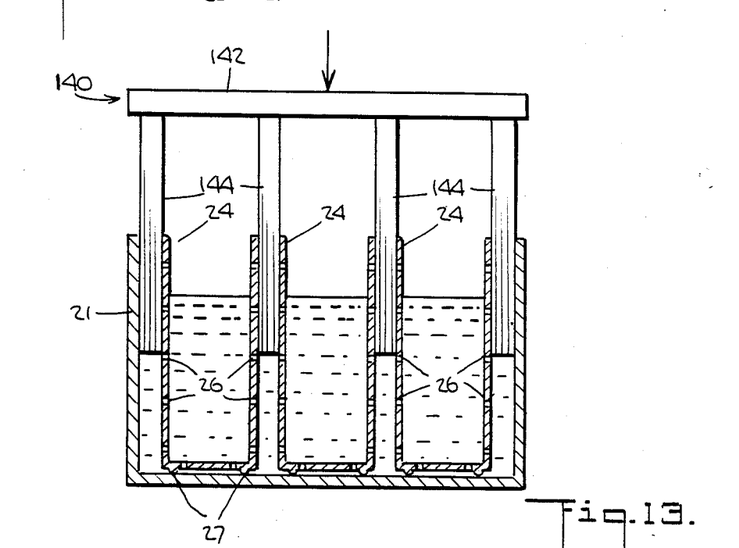
FIG. 13 is a view similar to FIG. 12 showing the displacement element partially inserted into the basin or receptacle.
Figure 14:
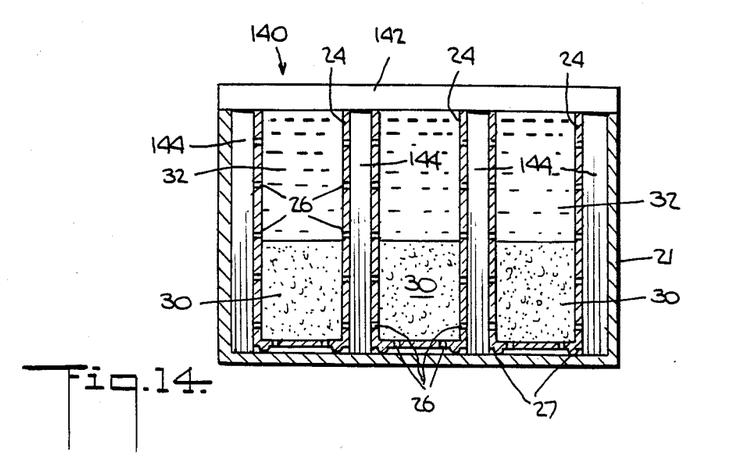
FIG. 14 is a view similar to FIG. 12 showing the displacement element fully inserted into the basin or receptacle.
Figure 15:
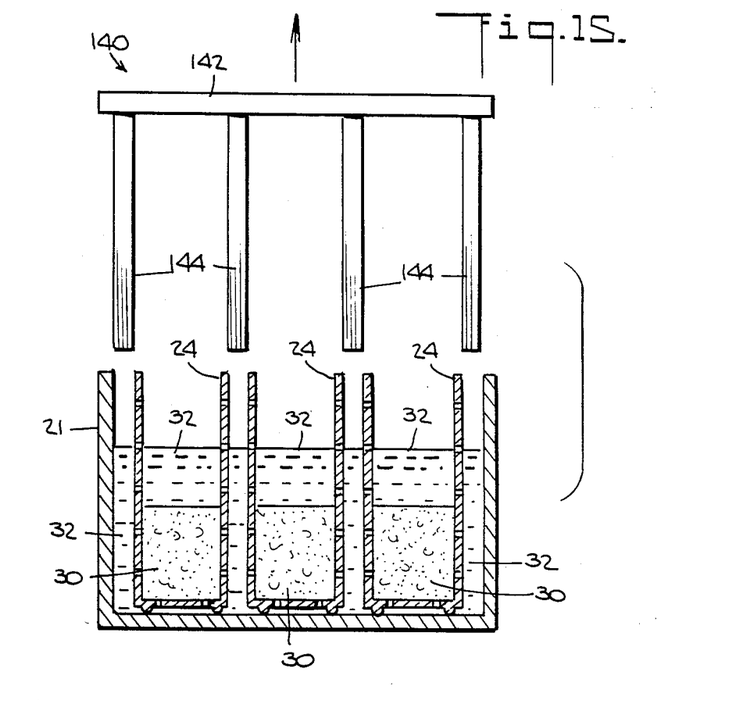
FIG. 15 is a view similar to FIG. 12 showing the removal of the displacement element following curd formation in the basin or receptacle.

As soon as the curd forming milk mixture has been placed in the molds 24 and before any curd begins to form, i.e. within the first few minutes of introduction of the mixture, the displacement member 140 in lowered into the receptacle or basin 21 with the rod like elements 144 entering into the spaces between the molds 24 and into the spaces between the molds and the receptacle on basin 21 as shown in FIG. 13. As the rod-like elements 144 move downwardly they displace the curd forming milk mixture in those spaces back through the preforations 26 in the molds 24 so that the molds now become filled with the curd forming milk mixture as shown in FIG. 14. Preferably the basin is initially filled to a level such that the volume displaced by the rod-like elements 144 will equal the empty volume of the molds so that when the rod-like elements are inserted, the milk mixture which they displace from the spaces between the molds and between the molds and the basin will just fill the molds themselves. The assembly is allowed to remain in this condition until, as shown in FIG. 14, curd 30 and whey 32 forms and separates in the molds 24. After curdling is completed, the displacement member 140 is removed and the whey 32 drains out through the perforations 26 and into the receptacle or basin 21. This whey may then be drained out from the basin via a suitable tap (not shown) and the molds containing the curd 30 are removed and placed on a draining table for further draining and turning.

As a result of the foregoing arrangement and procedure substantially all of the curd is formed in the molds 24 and little, if any, of the curd is required to be separated in a sack. Thus a maximum yield of high quality cheese of unbroken curd is obtained.

It will be appreciated that while the arrangement and procedure of FIGS. 12-15 has been described in conjunction with open top molds such as are shown in FIGS. 1 and 3, the same arrangements and procedures are equally useable with closed top molds such as are shown in FIG. 4.

FIGS. 16-19 show an apparatus which is particularly advantageous for preparing cheeses destined to be sold fresh.

Figure 16:
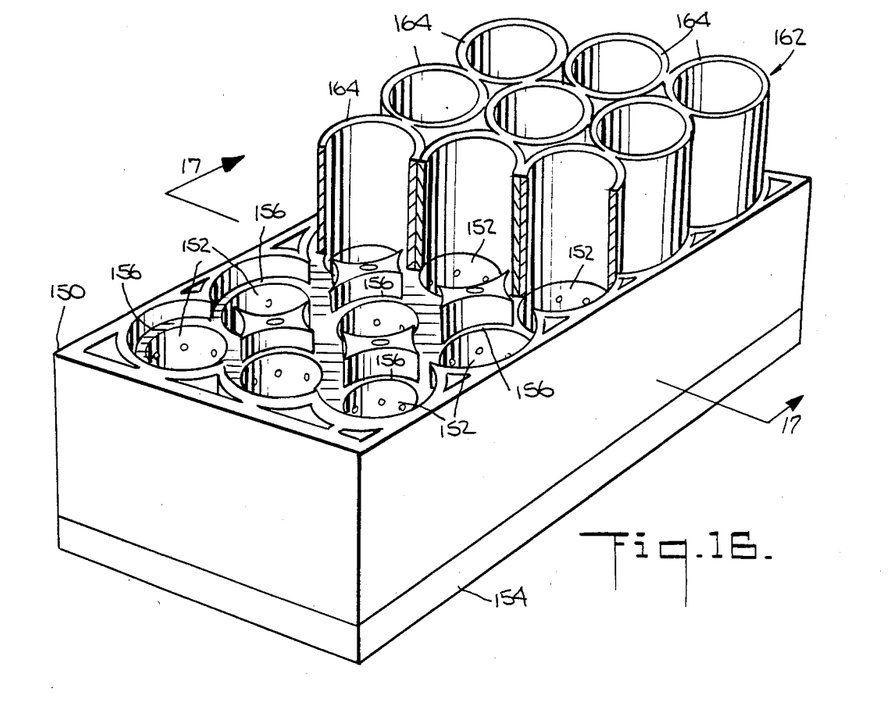
FIG. 16 is a perspective view, partially cut away, showing a mold block and cylinder assembly used in a further modification of the invention.
Figure 17:
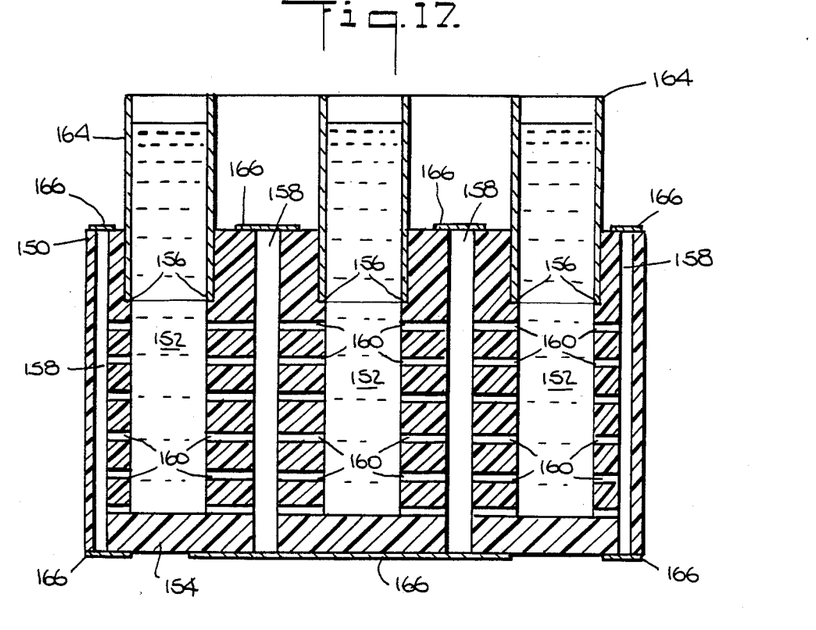
FIG. 17 is a view taken along line 17—17 of FIG. 16.
Figure 18:
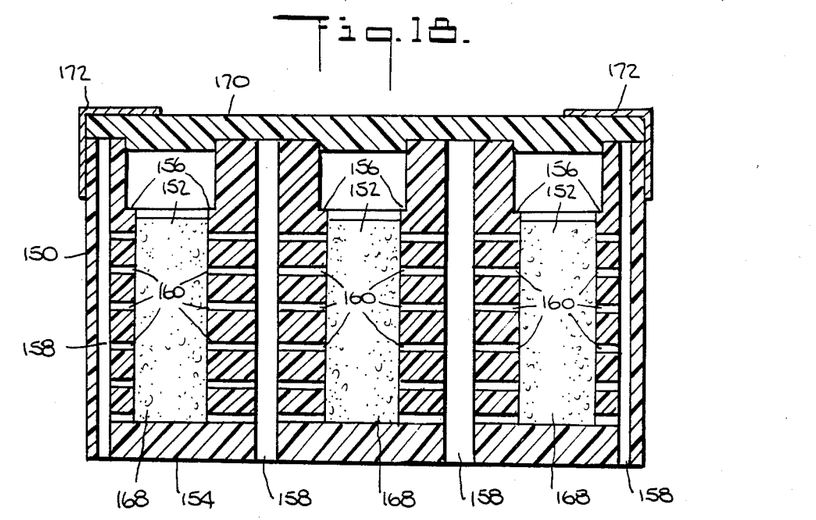
FIG. 18 is a view similar to FIG. 17 but with the cylinder assembly removed and replaced by a cover.

The apparatus of FIGS. 16 to 19 includes a mold block 150 consisting of a rectangular polystyrene block in which mold cavities 152 are hollowed out. The mold cavities are vertically elongated and are of generally uniform unobstructed cross section. The mold cavities 152 are formed closely spaced to each other and they open at the top and bottom of the block 150. As can be seen in FIGS. 16-18 a slab-like polystyrene block 154 covers the bottom of the block 150.

The mold cavities 152 are enlarged in cross section at their upper ends to form shoulders 156. As can be seen in FIG. 16, the mold cavities 152 communicate directly with each other above these shoulders. Vertical draining shafts 158 extend completely through both the mold block 150 and the block 154 at locations interspersed among the cavities 152. The mold cavities 152 communicate with the draining shafts 158 via horizontal channels 160. These horizontal channels serve the same function as the perforations 26 of the preceeding embodiments.

The apparatus further includes a cylinder block 162 which consists of portions of cylinders 164 all of the same length and soldered or otherwise connected together along their side surfaces in an arrangement corresponding exactly to that of the mold cavities 152 in the block 150. The cylinder block 162 is configured to fit into the enlarged ends of the mold cavities and to abut against the shoulders 156. In this position the cylinders 164 extend a substantial distance up above the mold cavities 152 and form extensions thereof.

This apparatus of FIGS. 16–19 is used in the following manner.

As shown in FIG. 17, the tops and bottoms of shafts 158 are sealed off with adhesive tape 166 in order to prevent leakage through the horizontal channels 160.

The cylinder block 162 is then fitted into the upper ends of the mold cavities 152. It will be noted that each mold cavity 152 together with its associated cylinder 164 constitutes a vertically extending mold of substantially uniform unobstructed cross section and perforated in its lower region by virtue of the channels 160. This arrangement forms a curdling enclosure, which includes the mold block 150 with its mold cavities 152, the cylinders 164 and the adhesive tape 166. The mold cavities are then filled with the curd forming milk mixture; and, as shown in FIG. 17, the cylinders 164 are also filled. When the curdling has taken place, the adhesive tape 166 is removed to allow the whey to be discharged through the channels 160 and the shafts 158 and to leave cheeses 168 in the mold cavities. When the draining of the whey has taken place, the level in the cylinders 164 will have fallen down into the mold cavities 152 below the cylinders. The cylinders 164 are then removed and a cover 170 is put in place and fixed with adhesive tape 172 as shown in FIG. 18. The mold block 150 and its cover 170 are then turned to drain cheeses 172 thus formed on their opposite side.

Figure 19:
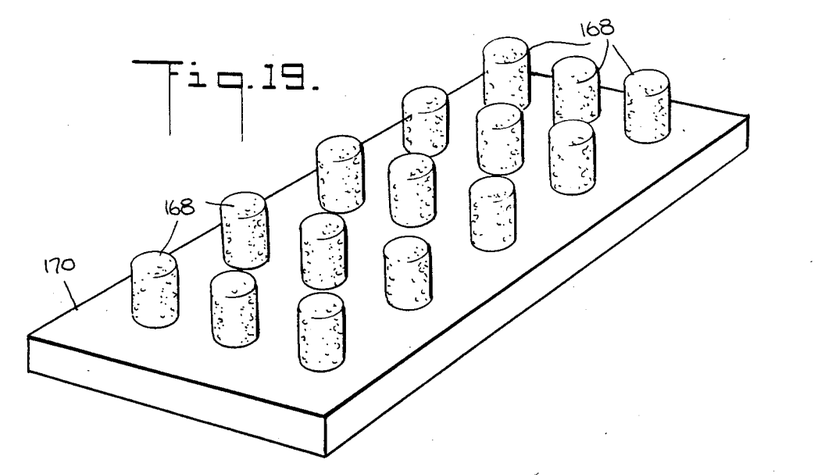
FIG. 19 is a view of the cover of FIG. 18 in inverted position and serving as a tray.

The mold block 150, furnished with its cover 170, can then be sold as it is, after the ends of the shafts 158 have once again been covered with adhesive tape to prevent leakage of residual whey. After the cheeses in their mold block have been sold they may be served by placing the mold block in inverted position with its cover 170 on the bottom, then removing the tape and lifting the mold block 150 up off from the cover. The cover 170 then serves as a tray from which the cheeses 168 can be served.

As will be apparent from the foregoing description, the invention makes possible the use of numerous specific modifications which work together to considerably simplify the fabrication of the fresh paste cheese and to improve its quality.

Of course, the invention is not limited to the specifically described examples, and numerous other arrangements can be incorporated without leaving the framework of the invention.

For example, one could prepare the milk and the additives in an intermediary receptacle, or even directly in the molds.

Figure 20:
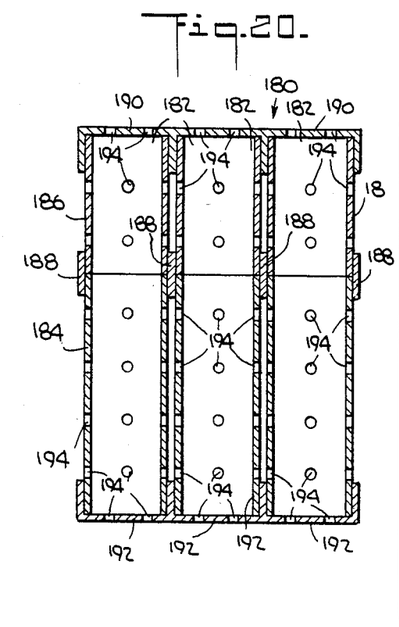
FIG. 20 is a side elevational section view of an alternate mold group according to the invention.
Figure 21:
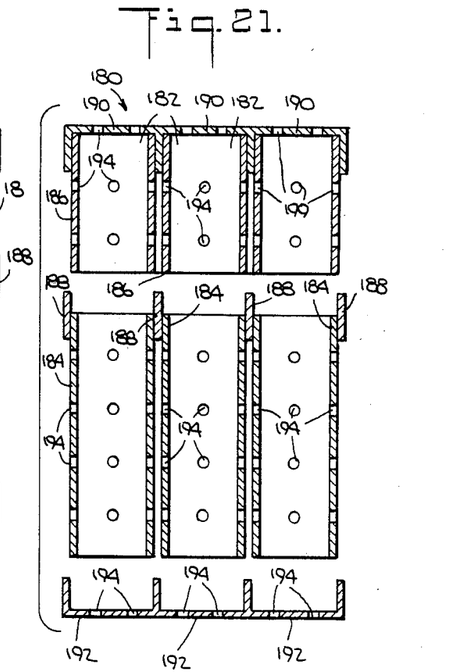
FIG. 21 is a view similar to FIG. 20 but showing the dissassembly of the molds in the mold group.
Figure 22:
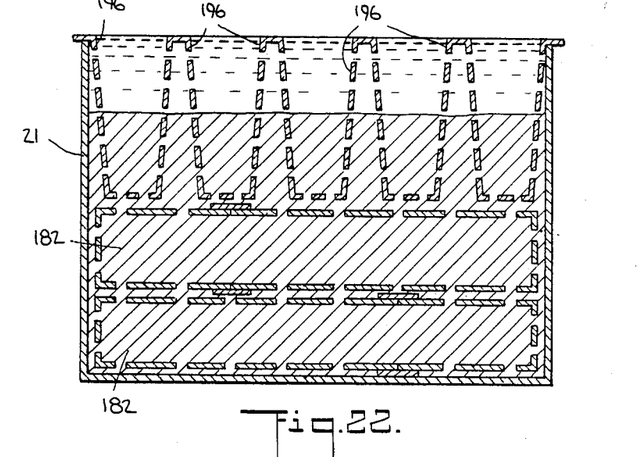
FIG. 22 is a side elevational section view of a receptacle containing the molds of FIGS. 20 and 21.

FIGS. 20–22 show modifications which are especially useful for making cheese of relatively large size. As shown in FIGS. 20 and 21, a mold assembly 180 is made up of a group of cylindrical molds 182. Each mold consists of a lower tubular section 184 and a shorter upper tubular section 186 interconnected by a sleeve 188 and closed at their upper and lower ends by caps 190 and 192. Groups of the caps and the sleeves are held together in arrays and the arrangement of each array of caps and each array of sleeves is identical so that they can be placed in alignment with the tubular sections 184 and 186 extending between them. The tubular sections fit closely into the caps and sleeves. It is preferred to have the sleeve 188 fixed to the upper ends of the lower tubular sections 184 and the upper caps 190 fixed to the upper ends of the upper tubular sections 186. This permits the molds to be disassembled as shown in FIG. 21 so that the various parts thereof may be easily and thoroughly washed. The molds may then be reassembled as shown in FIG. 20 by fitting the upper tubular sections 186 into its sleeves 188 and the lower tubular sections 184 into the lower end caps 192.

The caps, sleeves and tubular sections may be made of any suitable material such as aluminum, stainless steel or plastic. Also, as shown, the caps and tubular sections are provided with perforations 194 similar to the perforations 26 in the molds 24 of FIGS. 1, 3, 4 and 6.

It will be appreciated that the tubular sections may be made quite long and of any suitable diameter and yet the end caps 190 and 192 need not be very deep. This makes it possible to form the end caps by drawing or stamping.

The molds 182 may be placed in the receptacle or basin 21 in horizontal position as shown in FIG. 22. By way of example the molds 182 may be in two layers or shown and a group of smaller molds 196 may be positioned vertically in the receptacle or basin 21 as shown. The curdling milk mixture may be placed in the receptacle or basin 21 before the molds 182 and 196 are placed in the receptacle and in fact it is possible to mix the curd forming additives and the milk directly in the receptacle and then place the molds 182 and 196 in the receptacle. Because the curd does not form in the mixture for several minutes the molds may be placed in the receptacle and the mixture will enter and fill the molds via their perforations 194. Thereafter, when the curd 30 forms (assuming it is of a type which is heavier than the whey) it will completely fill the large horizontal molds 182 and will partially fill the smaller vertical molds 196 while the whey 32 floats above it. The whey may be removed as previously described and the groups of molds may be lifted out of the receptacle and sat up to drain.

As a further modification, the lower end caps 192 may be replaced by disposable perforated cups which extend down from the lower tubular sections 184. In this case an amount of milk mixture is placed in the tubular sections which will produce just enough curd to fill the cups which then are detached and placed in imperforate containers for sale. This arrangement makes possible the production of soft non-dried cheese of very high quality since its curd will be continuous and unbroken throughout.

Other modifications are possible and will be readily appreciated by those skilled in the art utilizing the teachings given herein.

I claim:

1. A method of preparing soft cheese comprising the steps of:
   placing a curd forming milk mixture into a plurality of closely spaced vertically elongated molds of substantially uniform and unobstructed internal cross section and maintained in mutual fluid communication via perforations in at least their lower region;
   maintaining the mixture in each mold at a temperature sufficient to cause curd and whey to form within said molds while preventing flow into or out of said mold;
   allowing curd and whey which is formed in each mold to stratify therein;
   removing the whey from said molds and allowing the curd which is formed in each mold to settle in the perforated lower region thereof without becoming broken to form uniform cheeses in said molds;

draining the cheeses in said molds by allowing liquid to flow through said perforations; and removing the cheeses from said molds.

2. A method according to claim 1 wherein said curd forming milk mixture is prepared simultaneously with the placement of the mixture into said molds by flowing the milk and additives into a mixing region and wherein the flow of additives to said mixing region is measured and the flow rate of the milk is controlled in response to such measurement.

3. A method according to claim 2 wherein the milk is pasteurized before mixing the additives with the milk.

4. A method according to claim 2 wherein the milk is mixed with the additives by flowing the milk tangentially into a funnel so that it flows around the surface of the funnel and flowing the additives onto the milk flowing in the funnel.

5. A method according to claim 1 wherein the interiors of said molds are in communication with each other via said perforations.

6. A method according to claim 5 wherein said curd forming mixture is at least partly placed in said molds via said perforations.

7. A method according to claim 6 wherein said curd forming mixture is placed into said molds while said molds are arranged in a basin-like receptacle.

8. A method according to claim 1 wherein the curd forming mixture is formed by mixing additives with milk before said mixture is placed in the molds.

9. A method according to claim 1 wherein said molds are arranged in a basin-like receptacle during the formation of curd and whey.

10. A method according to claim 9 wherein different groups of molds are arranged at different levels in said receptacle.

11. A method according to claim 9 wherein at least a portion of the whey is removed from said molds while they are in said receptacle.

12. A method according to claim 11 wherein a portion of said whey is removed by causing it to flow out from said molds via said perforations.

13. A method according to claim 9 wherein said step of draining said cheeses in said molds is carried out by removing said molds from said receptacle.

14. A method according to claim 9 wherein a draining sack is placed in said receptacle prior to placement of said molds therein and wherein after said molds are removed from said receptacle, said sack is also removed and allowed to drain to recover residual cheese.

15. A method according to claim 9 wherein displacement elements are placed into the spaces between the molds and into the spaces between the molds and the receptacle before curd begins to form in the mixture so that the mixture is displaced from said spaces and flows back into said molds via the perforations.

16. A method according to claim 15 wherein said displacement elements are maintained in said regions until after curd has formed in said molds.

17. A method according to claim 16 wherein said displacement elements are removed from said spaces after curd has formed in said molds to allow whey to drain out from said molds.

18. A method according to claim 15 wherein said receptacle is filled with said milk mixture to a level such that the unfilled volume of said molds substantially equals the filled volume of said spaces so that when the displacement elements are fully inserted into said spaces said molds become filled with the mixture.

19. A method according to claim 1 wherein said curd forming mixture is first placed in a basin-like receptacle and said molds are thereafter placed into said receptacle before curd begins to form in said mixture.

20. A method according to claim 19 wherein said molds are enclosed and wherein said mixture enters into and fills said molds via their perforations.

21. A method according to claim 1 wherein said step of draining said cheeses is carried out by placing, in inverted position over said molds, other perforated molds of the same substantially uniform and uninterrupted cross section and inverting said molds so that said cheeses lie in inverted position in said other molds.

22. A method according to claim 1 wherein, prior to placing a curd forming mixture in said molds, said molds are placed in a basin-like receptacle and other perforated molds of the same subtantially uniform and uninterrupted cross section are inverted and placed over said molds to form enclosed molds and the curd forming mixture is flowed into said molds and said other molds via their perforations.

23. A method according to claim 22 wherein said step of draining is carried out in first part by removing said molds from said receptacle and allowing liquids to drain through said perforations and in further part by inverting said molds to reverse the cheeses therein and permit further draining through said perforations.

24. A method according to claim 1 wherein said molds are formed as cavities in a mold block and said perforations extend as channels from the surfaces of said cavities to the external surfaces of said block and wherein said step of preventing flow out through said perforations is carried out by sealing off the exterior surfaces of said mold block.

25. A method according to claim 24 wherein said step of draining the cheeses is carried out by unsealing said external surfaces of said mold block.

26. A method according to claim 25 wherein said step of draining the cheeses is carried out by covering the upper ends of said cavities, allowing whey to drain through said channels, inverting the mold block and allowing additional whey to drain through said channels.

27. A method according to claim 24 wherein tubular extensions having the same cross section as said cavities are removably mounted on the upper surface of said mold block to extend up from the cavities therein and, together with said cavities, are filled with said curd forming milk mixture and wherein after said step of draining said cheeses has been carried out until said extensions are empty, said extensions are removed and replaced by a cover over the upper ends of said cavities.

* * * * *